United States Patent [19]
Koda

[11] Patent Number: 5,579,386
[45] Date of Patent: Nov. 26, 1996

[54] TELEPHONE NETWORK ALERTING CADENCE CONTROL SYSTEM

[75] Inventor: Eiji Koda, Kawasaki, Japan

[73] Assignee: Fujitsu Limited, Kanagawa, Japan

[21] Appl. No.: 430,141

[22] Filed: Apr. 26, 1995

Related U.S. Application Data

[63] Continuation of Ser. No. 939,315, Sep. 2, 1992, abandoned.

[30] Foreign Application Priority Data

Sep. 2, 1991 [JP] Japan ................................. 3-221463

[51] Int. Cl.$^6$ .......................................................... H04M 3/06
[52] U.S. Cl. .......................... 379/252; 379/142; 379/251; 379/377; 379/399
[58] Field of Search .............................. 379/27, 29, 102, 379/142, 201, 251, 252, 253, 254, 255, 256, 372, 373, 377, 375, 382, 399, 418

[56] References Cited

U.S. PATENT DOCUMENTS

| | | | |
|---|---|---|---|
| 3,492,436 | 1/1970 | Feiner et al. | 379/255 |
| 3,492,437 | 1/1970 | Feiner et al. | 379/252 |
| 4,113,990 | 9/1978 | Nojiri et al. | 379/255 |
| 4,232,199 | 11/1980 | Boatwright et al. | 379/201 |
| 4,349,703 | 9/1982 | Chea, Jr. | 379/418 |
| 4,605,824 | 8/1986 | Birlmeier et al. | 379/254 |
| 4,656,659 | 4/1987 | Chea, Jr. | 379/253 |
| 4,833,708 | 5/1989 | Goodrich | 379/327 |
| 4,926,467 | 5/1990 | Meier | 379/252 |
| 4,995,075 | 2/1991 | Angiolillo-Bent et al. | 379/253 |
| 5,216,708 | 6/1993 | Furukawa et al. | 379/165 |
| 5,299,316 | 3/1994 | Suzuki | 379/201 |
| 5,309,509 | 5/1994 | Cocklin et al. | 379/201 |
| 5,347,566 | 9/1994 | Low et al. | 379/27 |
| 5,442,692 | 8/1995 | Yamazaki et al. | 379/253 |

*Primary Examiner*—Krista M. Zele
*Assistant Examiner*—Scott L. Weaver

[57] ABSTRACT

An alerting cadence control system for a telephone network having a telephone exchange, subscriber transmission equipment connected to the telephone exchange, and a plurality of telephone sets each connected to the subscriber transmission equipment. The subscriber transmission equipment includes a plurality of subscriber interface cards and subscriber-shared alerting cadence control means, each of the cards incorporating a switch for performing alerting cadence switching of each telephone set. The subscriber-shared alerting cadence control means has a memory for control setting data in the format of a table in which is written a control program for controlling the switch connected to each telephone set. Where alerting cadence control is to cover a new subscriber service offered to a new telephone set, the applicable data in the table are modified from the telephone exchange under remote control without replacement of the subscriber interface card for that telephone set. This provides easy alerting cadence control over service requirements of newly added subscribers.

4 Claims, 6 Drawing Sheets

FIG. 3

| Item No. | Switching control | Timer setting | First silent interval | Next item No. |
|---|---|---|---|---|
| 1 | ON | 4 s | x | 2 |
| 2 | OFF | 2 s | ○ | 3 |
| 3 | ON | 4 s | x | 4 |
| 4 | OFF | 2 s | x | 3 |

FIG. 4

| Item No. | Switching control | Timer setting | Preprocessing function | Postprocessing function | Next item No. |
|---|---|---|---|---|---|
| 1 | ON | 4 s | — | — | 2 |
| 2 | OFF | 2 s | FSIRPT |  | 3 |
| 3 | ON | 4 s | — | — | 4 |
| 4 | OFF | 2 s | — | — | 3 |

| Subscriber No. | Control setting table type |
|---|---|
| 1 | 30 A |
| 2 | 30 B |
| ⋮ | ⋮ |

50

| Subscriber No. | Control setting table type |
|---|---|
| 1 | 40 A |
| 2 | 40 B |
| ⋮ | ⋮ |

60

TELEPHONE NETWORK ALERTING CADENCE CONTROL SYSTEM

This is a continuation of application Ser. No. 07/939,315, filed Sep. 2, 1992 abandoned.

BACKGROUND OF THE INVENTION

1. Field of the Invention

The present invention relates to an alerting cadence control system for use with a telephone network comprising a plurality of telephone sets.

2. Description of the Prior Art

The term "alerting cadence," as defined and used by U.S. industries involved with communication technology, refers to the cycle of ringing cadence of telephone sets (i.e., ringing cycle of subscriber telephone sets). Recent years have seen an appreciable increase in the demand for telephone sets with newly added functions following the implementation of various business communication services and ISDN (integrated services digital network) applications requiring such functions. Existing telephone sets are being replaced with or supplemented by these novel telephone sets. With more and more subscribers signing up for newly introduced services that rely on the new telephone functions, there is a growing need for a control system that flexibly controls the subscriber alerting cadence of the telephone network with efficiency.

A typical prior art alerting cadence control system will now be described with reference to FIG. 1. Subscriber transmission equipment 1 is connected on the one hand to a telephone exchange by a telephone line 2. Generally the subscriber transmission equipment 1 is located far away from the telephone exchange. The subscriber transmission equipment 1 is connected on the other hand to subscriber telephone sets 3 by subscriber lines 4, the telephone sets 3 being located within a certain area centering on the equipment 1.

Positioned where it is, the subscriber transmission equipment 1 comprises a subscriber interface card 5 connected to each subscriber telephone set 3 by a subscriber line 4 and a ringer generator 6 for outputting a high frequency signal S1. The subscriber interface card 5 includes a changeover switch 7 and an alerting cadence controller 8 that controls the switching action of the changeover switch 7 for control over the subscriber alerting cadence.

The changeover switch 7, comprising a movable contact 9 and terminals 10 and 11, enters one of three states when activated: one in which the movable contact 9 comes into contact with the terminal 10, another in which the movable contact 9 contacts the terminal 11, and another in which the movable contact 9 contacts neither of the terminals 10 and 11. The alerting cadence controller 8 is composed either of hardware containing logic circuits that realize the logic for controlling the switching action of the changeover switch 7, or of software made of programs in a ROM or the like for controlling the same action.

In the above setup, the alerting cadence controller 8 provides control over bringing or not bringing the movable contact 9 of the changeover switch 7 into contact with the terminal 10. This action or inaction places onto the subscriber line 4 or withholds therefrom the high frequency signal S1 coming from the ringer generator 6 for the control of the subscriber alerting cadence.

The above-described alerting cadence control system has among others a major disadvantage. That is, when a new subscriber service is offered to a new function-equipped telephone set replacing the old telephone 3, the hitherto-used subscriber interface card 5 must be replaced with a new subscriber interface card. In that case, the service engineer in charge of the replacement must travel all the way to the distant subscriber transmission equipment 1 for work. This means not only the inability to address the subscriber's need at short notice but also more man-hours, hence more costs, required to complete the task.

SUMMARY OF THE INVENTION

It is therefore an object of the present invention to provide a telephone network alerting cadence control system which, when a new subscriber service is offered to a subscriber's telephone set, modifies or adds to the alerting cadence for that telephone set through remote-controlled data entry.

In accordance with an aspect of the present invention, there is provided an alerting cadence control system for a telephone network having a telephone exchange, subscriber transmission equipment connected to the telephone exchange by a first line, and a plurality of telephone sets each connected to the subscriber transmission equipment by a second line, the control system comprising: an oscillator for outputting a high frequency signal; a plurality of switching means each provided for each of the plurality of telephone sets for performing a first and a second switching action, the first switching action including connecting the oscillator to and disconnecting the oscillator from the second line connected to each telephone set, the second switching action including connecting the first line to and disconnecting the first line from the second line; subscriber-shared alerting cadence control means connected to the switching means for controlling the first switching action of each of the plurality of switching means, the subscriber-shared alerting cadence control means including a control setting table in which is written a control program for controlling each of the switching means connected to each of the telephone sets; timer means operatively connected to the subscriber-shared alerting cadence control means for setting the timing for the first switching action of each of the switching means; and remote control means for modifying the settings in the control setting table through remote control.

Each switching means is contained in the subscriber interface card provided for each of the telephone sets. Preferably, the control setting table is furnished for each of the telephone sets.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is a view describing a control setting table for alerting cadence control by the embodiment;

FIG. 4 is a view depicting another control setting table similar to the one of FIG. 3;

DESCRIPTION OF THE PREFERRED EMBODIMENTS

Figure 1:
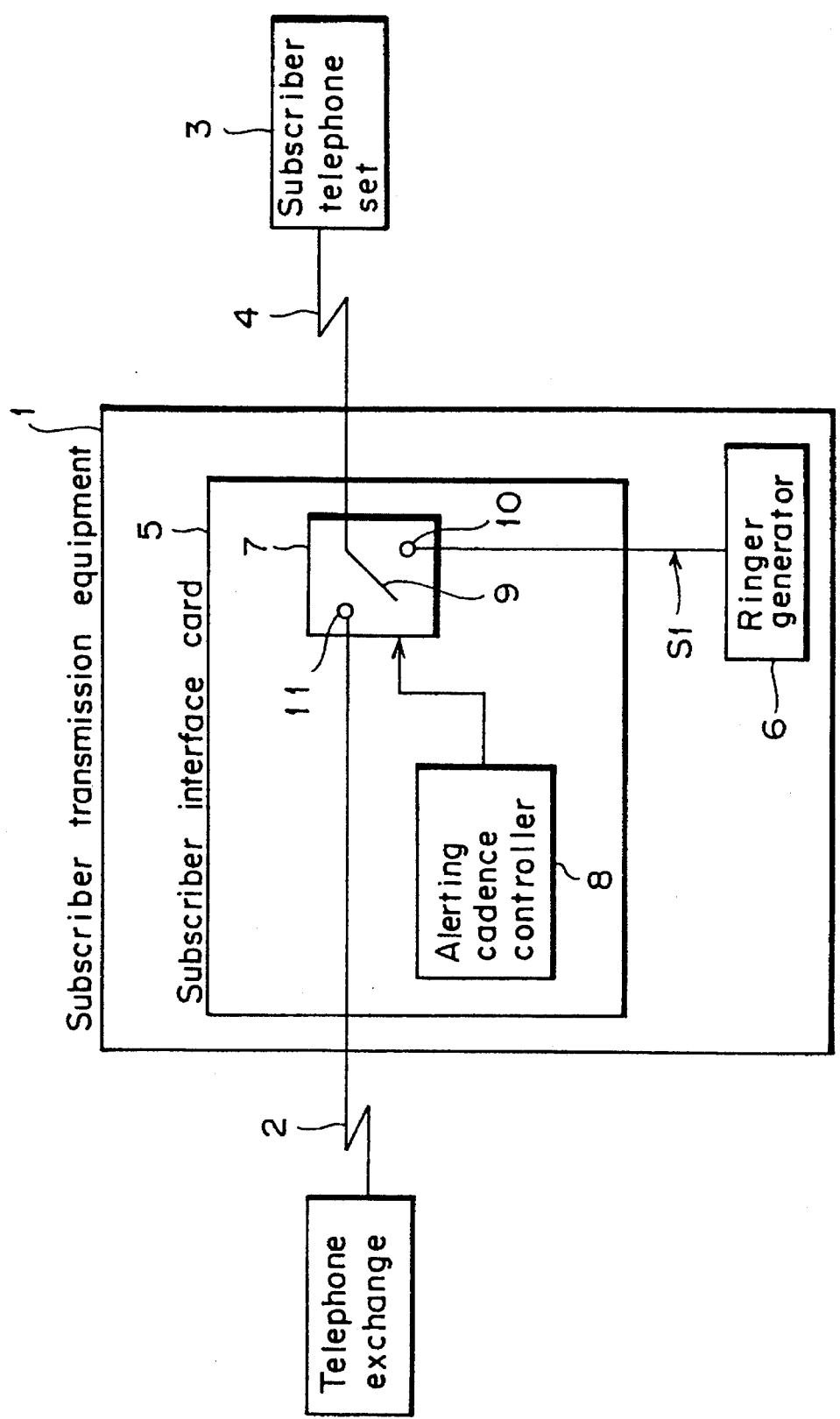
FIG. 1 is a block diagram of a typical prior art alerting cadence control system.
Figure 2:
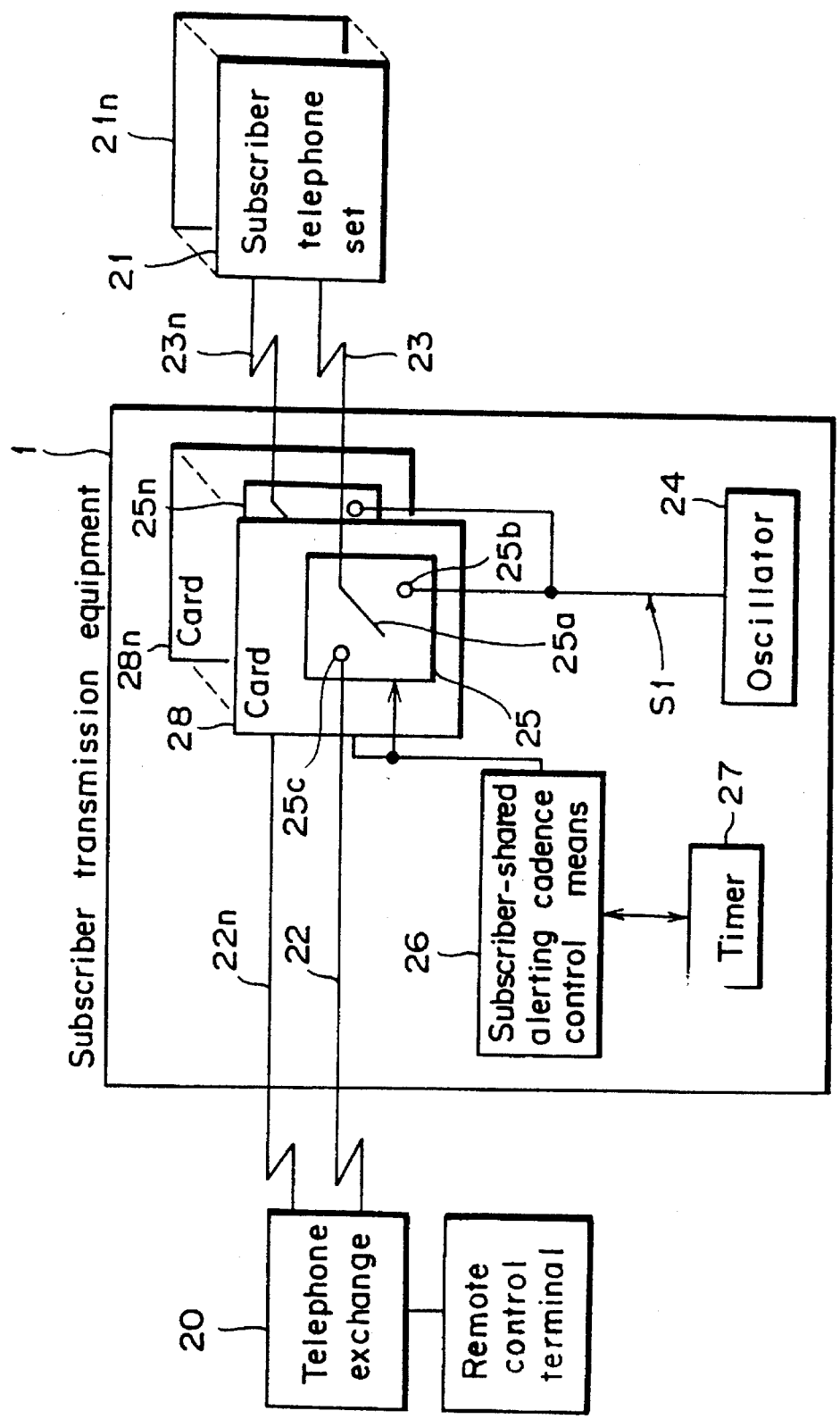
FIG. 2 is a block diagram of an alerting cadence control system embodying the present invention.

FIG. 2 is a block diagram of an alerting cadence control system embodying the invention. In FIG. 2, subscriber transmission equipment 1 is connected to a telephone exchange 20 by lines 22 through 22n. Generally the subscriber transmission equipment 1 is located far away from the telephone exchange 20. Furthermore, the subscriber transmission equipment 1 is connected to subscriber telephone sets 21 through 21n by lines 23 through 23n, the telephone sets being located within a certain area centering on the equipment 1. It is the subscriber transmission equipment 1 that controls the alerting cadence of each of the telephone sets 21 through 21n.

The subscriber transmission equipment 1 comprises an oscillator 24 that outputs a high frequency signal S1, a plurality of switches 25 through 25n, subscriber-shared alerting cadence control means 26, and a timer 27. The switches 25 through 25n are incorporated respectively in subscriber interface cards 28 through 28n, each switch corresponding to each of the telephone sets 21 through 21n.

The switches 25 through 25n carry out a first and a second switching action. The first switching action involves the switches 25 through 25n connecting and disconnecting the oscillator 24 to and from the lines 23 through 23n which in turn are connected to the telephone sets 21 through 21n. The second switching action involves the switches 25 through 25n connecting and disconnecting the lines 23 through 23n, coupled to the telephone sets 21 through 21n, to and from the lines 22 through 22n coupled to the telephone exchange 20. In operation, the switch 25 containing a movable contact 25a and terminals 25b and 25c enters one of three states as shown: one in which the movable contact 25a comes into contact with the terminal 25b, another in which the movable contact 25a contacts the terminal 25c, and another in which the movable contact 25a contacts neither of the terminals 25b and 25c.

The subscriber-shared alerting cadence control means 26 is connected to the switches 25 through 25n to control the switching action of the switches 25 through 25n as shown in FIG. 2 and, for that purpose, includes control setting tables 30 or 40 (FIGS. 3 and 4) that contain appropriate control programs. The subscriber-shared alerting cadence control means 26 should preferably be implemented by use of an erasable nonvolatile memory such as an E$^2$PROM (electrical erasable PROM). The timer 27 starts counting time upon request from the subscriber-shared alerting cadence control means 26. After counting, the timer 27 notifies the means 26 of the end of its counting operation.

As shown in FIG. 3, each of the control setting tables 30 comprises an item number column 31 in which item numbers are set; a switching control column 32 containing the ON/OFF settings for connecting and disconnecting the oscillator 24 to and from the lines 23 through 23n coupled to the switches 25 through 25n and to the telephone sets 21 through 21n; a timer setting column 33 containing time settings on the timer 27; a first silent interval column 34 having the settings for notifying the telephone exchange of a first silent interval for indicating who is calling; and a next item number column 35 having the settings of the next item numbers to be reached. The contents of the columns 31 through 35 may be modified as desired.

FIG. 4 depicts another control setting table 40 similar to the one in FIG. 3. The control setting table 40 is made of an item number column 41 in which item numbers are set; a switching control column 42 containing the ON/OFF settings for connecting and disconnecting the oscillator 24 to and from the lines 23 through 23n coupled to the switches 25 through 25n and to the telephone sets 21 through 21n; a timer setting column 43 containing time settings on the timer 27; a preprocessing function column 44 and a postprocessing function column 45 containing the function settings for notifying the telephone exchange of requests for new services including the above-described first silent interval feature; and a next item number column 46 having the settings of the next item numbers to be reached. The contents of the columns 41 through 46 may be modified as desired.

The control setting table 30 or 40 is furnished for each of the individual telephone sets 21 through 21n. Preferably, the contents of the table 30 or 40 should be modified under remote control. Modification of the table settings under remote control is assisted by programming a type indication table 50 or 60 (see FIGS. 5 and 6) in the subscriber-shared alerting cadence control means 26. The type indication table 50 or 60 contains the correspondences of the control setting table type (30 or 40) with the subscriber numbers of the individual telephone sets 21 through 21n. The type indication table and the control setting table may be invoked as desired under remote control.

When the embodiment outlined above is to control the alerting cadence of, say, the subscriber telephone set 21, the switch 25 is turned on or off depending on the applicable settings in the control setting table 30 or 40 of the subscriber-shared alerting cadence control means 26. The switching action causes the high frequency signal S1 from the oscillator 24 to be sent or be kept from being sent to the telephone set 21.

However, before control of the above kind is provided, it is necessary to establish or modify beforehand the appropriate settings in the control setting table 30 or 40. For example, where the telephone set 21 is replaced with a new function-equipped telephone set, terminal equipment at the telephone exchange gains access under remote control to the subscriber transmission equipment 1 and calls up the type indication table 50 of FIG. 5 therefrom.

If the control setting table 30A shown in FIG. 3 is applicable to the telephone set 21, the table 30A is selected as a type of the control setting table from the type indication table 50. The selection is followed by a display of the control setting table 30A of FIG. 3 on the terminal equipment of the telephone exchange. Viewing the display, the operator at the terminal equipment then sets desired values and/or symbols in the appropriate columns of the table. It is assumed here that the settings are made as shown in FIG. 3. On the assumption that the telephone set 21 is equipped with the first silent interval function, an "Applicable" symbol (e.g., a circle) is set in the first silent interval column 34 at item number 2 in the control setting table 30A.

Figure 5:
FIG. 5 is a view explaining a type indication table for selecting the control setting table of FIG. 3.
Figure 6:
FIG. 6 is a view of another type indication table for selecting the control setting table of FIG. 4.

Given the control setting table 30A whose contents were modified as depicted above, the embodiment performs alerting cadence control as follows: Initially, the type indication table 50 is selected in response to a request for subscriber alerting cadence control. If the subscriber number for which alerting cadence control is to be provided is 1, the control setting table 30A is selected (as shown in FIG. 5).

An ON instruction at item number 1 in the switching control column 32 of the table 30A operates the switch 25 to connect the oscillator 24 with the line 23. This allows the high frequency signal S1 to be fed to the telephone set 21 over the line 23. The bell of the telephone set 21 is then activated.

At the same time as the ON instruction is issued, a time count request is sent to the timer 27, which starts counting time. Because a "Nonapplicable" setting (e.g., a cross) is established at item number 1 for the first silent interval function, that function is left inactive. Upon elapse of four seconds (i.e., timer setting), the timer 27 notifies the alerting cadence control means 26 of the end of its counting. This causes the next item number 2 to be referenced.

An OFF instruction at item number 2 in the switching control column 32 operates the switch 25 to disconnect the oscillator 24 from the line 23. This prevents the high frequency signal S1 from being sent to the telephone set 21. Thus the bell of the telephone set 21 remains inactive.

At the same time as the OFF instruction is issued, a time count request is sent to the timer 27, which starts counting time. Because an "Applicable" setting (a circle) is established at item number 2 for the first silent interval function, the telephone exchange 20 is notified of that interval. Upon elapse of two seconds (timer setting), the timer 27 notifies the alerting cadence control means 26 of the end of its counting. This causes the next item number 3 to be referenced.

The same kind of alerting cadence control applies to the item numbers 3, 4 and on according to the control instructions set for the respective item numbers. When the telephone set 21 goes off-hook under alerting cadence control, the switch 25 connects the lines 23 and 22 so that the other party's telephone number is displayed in the first silent interval on the telephone set 21. Communication with the other party is thus made available.

Alerting cadence control in effect when the alternative control setting table 40A of FIG. 4 is set in the alerting cadence control means 26 is approximately the same as that in the case of the table 30. The difference is that the settings in the preprocessing function column 44 and postprocessing function column 45 are executed instead of those in the first silent interval column 34.

Specifically, the type indication table 60 is selected in response to a request for subscriber alerting cadence control. If the subscriber number for which alerting cadence control is to be provided is 1, the control setting table 40A is selected. Where a function is set at item number 1 in the preprocessing function column 44 of the table 40A, that function is invoked and the telephone exchange 20 is notified thereof.

An ON instruction at item number 1 in the switching control column 42 of the table 40A operates the switch 25 to connect the oscillator 24 with the line 23. This allows the high frequency signal S1 to be fed to the telephone set 21. The bell of the telephone set 21 is then activated. At the same time as the ON instruction is issued, a time count request is sent to the timer 27, which starts counting time. If a function is set in the postprocessing function column 45, that function is invoked and the telephone exchange 20 is notified thereof.

Upon elapse of four seconds (timer setting), the timer 27 notifies the alerting cadence control means 26 of the end of its counting. This causes the next item number 2 to be referenced. The same kind of alerting cadence control applies to the item numbers 2, 3, 4 and on according to the control instructions set for the respective item numbers.

As described and according to the invention, when a new subscriber service is offered to a new function-equipped telephone set replacing the old telephone set, there is no need for the service engineer in charge to travel all the way to the distant subscriber transmission equipment 1 for work. That is, the contents of the alerting cadence control means 26 of the subscriber transmission equipment 1 may be modified under remote control so as to provide the new subscriber service desired. The alerting cadence control system of the invention not only addresses the subscriber's needs at much shorter notice but also requires less man-hours for completing the task.

Where the switches are incorporated in cards, additionally installed telephone sets are dealt with by simply inserting the appropriate cards into suitable slots. That is, personnel with little experience or technical knowledge may carry out card installation to address the telephone sets added. The settings for subsequent alerting cadence control over these telephone sets may then be established under remote control as described.

Furthermore, an erasable nonvolatile memory may be used in the subscriber-shared alerting cadence control means 26. This arrangement if adopted allows programmed data to be changed as needed in the table 30 or 40 while protection of the data is ensured during power outage.

As many apparently different embodiments of this invention may be made without departing from the spirit and scope thereof, it is to be understood that the invention is not limited to the specific embodiments thereof except as defined in the appended claims.

What is claimed is:

1. An alerting cadence control system installed in a subscriber transmission equipment for a telephone network including a telephone exchange, said subscriber transmission equipment being connected to said telephone exchange by a plurality of first lines, and a plurality of telephone sets each connected to said subscriber transmission equipment by a respective one of a plurality of second lines, the control system comprising:

an oscillator for outputting a high frequency signal;

a plurality of switching means, one of said plurality of switching means being provided for each of said plurality of telephone sets for performing a first and a second switching action, said first switching action including connecting said oscillator to and disconnecting said oscillator from a respective one of said plurality of second lines connected to an associated telephone set, said second switching action including connecting a respective one of said plurality of first lines to and disconnecting said respective one first line from said respective one second line, each of said plurality of switching means being incorporated in a respective subscriber interface card;

subscriber-shared alerting cadence control means connected to said plurality of switching means for controlling said first switching action of each of said plurality of switching means, said subscriber-shared alerting cadence control means including first memory means for storing data in the format of a plurality of control setting tables in each of which is written a control program for controlling each one of said plurality of switching means connected to each one of said plurality of telephone sets so that said first switching action of each of said plurality of switching means causes said high frequency signal to be sent to or be prevented from being sent to the associated one of the plurality of telephone sets through the respective second line, and second memory means for storing data in the format of a type indication table containing correspondences of control setting table types with respective subscriber numbers of said telephone sets;

timer means connected to said subscriber-shared alerting cadence control means for setting timing intervals for said first switching action of each of said plurality of switching means; and remote control means located at and connected to said telephone exchange for modifying settings for each one of said plurality of telephone sets individually, said remote control means modifying settings in said plurality of control setting tables and said type indication table through remote terminal equipment via said first lines so as to address subscriber needs for services at installations of said individual telephone sets and to respond to subscriber requests for new services.

2. An alerting cadence control system according to claim 1, wherein said first memory means for storing data for said plurality of control setting tables includes an erasable non-volatile memory device.

3. An alerting cadence control system installed in a subscriber transmission equipment for a telephone network including a telephone exchange, said subscriber transmission equipment being connected to said telephone exchange by a plurality of first lines, and a plurality of telephone sets each connected to said subscriber transmission equipment by a respective one of a plurality of second lines, the control system comprising:

an oscillator for outputting a high frequency signal;

a plurality of switching means, one of said plurality of switching means being provided for each of said plurality of telephone sets for performing a first and a second switching action, said first switching action including connecting said oscillator to and disconnecting said oscillator from a respective one of said plurality of second lines connected to an associated telephone set, said second switching action including connecting a respective one of said plurality of first lines to and disconnecting said respective one first line from said respective one second line;

subscriber-shared alerting cadence control means connected to said plurality of switching means for controlling said first switching action of each of said plurality of switching means, said subscriber-shared alerting cadence control means including memory means for storing data in the format of at least one control setting table in which is written a control program for controlling each one of said plurality of switching means connected to each one of said plurality of telephone sets so that said first switching action of each of said plurality of switching means causes said high frequency signal to be sent to or be prevented from being sent to the associated one of the plurality of telephone sets through the respective second line;

timer means connected to said subscriber-shared alerting cadence control means for setting timing intervals for said first switching action of each of said plurality of switching means; and remote control means connected to said telephone exchange for modifying settings for each one of said plurality of telephone sets individually, said remote control means modifying settings in said at least one control setting table through remote terminal equipment via said first lines so as to address subscriber needs for services at installations of said individual telephone sets and to respond to subscriber requests for new services, wherein said at least one control setting table comprises:

an item number column in which item numbers are set;

a switching control column containing on/off settings for controlling said first switching action of each of said switching means;

a timer setting column containing timer settings for said timer means;

a first silent interval column having settings for notifying said telephone exchange of a first silent interval for indicating who is calling; and a next item number column having settings of next item numbers to be processed.

4. An alerting cadence control system installed in a subscriber transmission equipment for a telephone network including a telephone exchange, said subscriber transmission equipment being connected to said telephone exchange by a plurality of first lines, and a plurality of telephone sets each connected to said subscriber transmission equipment by a respective one of a plurality of second lines, the control system comprising:

an oscillator for outputting a high frequency signal;

a plurality of switching means, one of said plurality of switching means being provided for each of said plurality of telephone sets for performing a first and a second switching action, said first switching action including connecting said oscillator to and disconnecting said oscillator from a respective one of said plurality of second lines connected to an associated telephone set, said second switching action including connecting a respective one of said plurality of first lines to and disconnecting said respective one first line from said respective one second line;

subscriber-shared alerting cadence control means connected to said plurality of switching means for controlling said first switching action of each of said plurality of switching means, said subscriber-shared alerting cadence control means including memory means for storing data in the format of at least one control setting table in which is written a control program for controlling each one of said plurality of switching means connected to each one of said plurality of telephone sets so that said first switching action of each of said plurality of switching means causes said high frequency signal to be sent to or be prevented from being sent to the associated one of the plurality of telephone sets through the respective second line;

timer means connected to said subscriber-shared alerting cadence control means for setting timing intervals for said first switching action of each of said plurality of switching means; and remote control means connected to said telephone exchange for modifying settings for each one of said plurality of telephone sets individually, said remote control means modifying settings in said at least one control setting table through remote terminal equipment via said first lines so as to address subscriber needs for services at installations of said individual telephone sets and to respond to subscriber requests for new services, wherein said at least one control setting table comprises:

an item number column in which item numbers are set;

a switching control column containing on/off settings for controlling said first switching action of each of said switching means;

a timer setting column containing timer settings for said timer means;

processing function columns containing function settings for notifying said telephone exchange of requests for new services including a first silent interval for indicating who is calling; and a next item number column having settings of next item numbers to be processed.

* * * * *